United States Patent
Germain

(10) Patent No.: US 7,735,846 B2
(45) Date of Patent: Jun. 15, 2010

(54) HYDRAULIC CONTROL CIRCUIT

(76) Inventor: Philippe Germain, 96 rue Gambetta, Fontenay-sous-Bois (FR) 94120

( * ) Notice: Subject to any disclaimer, the term of this patent is extended or adjusted under 35 U.S.C. 154(b) by 352 days.

(21) Appl. No.: 11/880,782

(22) Filed: Jul. 24, 2007

(65) Prior Publication Data

US 2008/0067770 A1 Mar. 20, 2008

(30) Foreign Application Priority Data

Sep. 19, 2006 (GB) ................................ 0618333.9

(51) Int. Cl.
*B60G 21/067* (2006.01)
(52) U.S. Cl. .................. 280/124.16; 280/124.106; 280/5.506; 280/124.161
(58) Field of Classification Search ............. 280/5.506, 280/5.508, 124.106, 124.16, 124.161, 5.511, 280/5.507, 5.505, 124.157
See application file for complete search history.

(56) References Cited

U.S. PATENT DOCUMENTS

| | | | |
|---|---|---|---|
| 5,431,431 A | * | 7/1995 | Fulks et al. ............... 280/5.511 |
| 5,492,451 A | | 2/1996 | Franz et al. |
| 6,179,310 B1 | * | 1/2001 | Clare et al. ............ 280/124.159 |
| 6,206,383 B1 | * | 3/2001 | Burdock .................. 280/5.508 |
| 6,520,510 B1 | * | 2/2003 | Germain et al. .......... 280/5.511 |
| 6,533,294 B1 | * | 3/2003 | Germain et al. .......... 280/5.511 |
| 6,634,445 B2 | * | 10/2003 | Dix et al. .................... 180/6.48 |
| 6,663,114 B2 | * | 12/2003 | Lamela et al. ............. 280/6.15 |
| 7,293,780 B2 | * | 11/2007 | Germain et al. .......... 280/5.506 |
| 2009/0115147 A1 | * | 5/2009 | Zuurbier et al. .......... 280/5.506 |

FOREIGN PATENT DOCUMENTS

FR 2775024 A1 8/1998
WO WO2005/108128 A2 11/2005

* cited by examiner

*Primary Examiner*—Paul N Dickson
*Assistant Examiner*—Drew Brown
(74) *Attorney, Agent, or Firm*—Dickinson Wright PLLC

(57) ABSTRACT

A hydraulic control circuit (100) comprises a source (180) of fluid pressure having a fluid inlet (201) and a fluid outlet (202); a fluid reservoir (181) fluidly connected to the fluid inlet of the pressure source; an attenuation means (111) having a fluid inlet (203) fluidly connected to the fluid outlet of the pressure source, and a fluid outlet (204); a pressure control valve (199) fluidly connected to the fluid inlet of the attenuation means and to the fluid reservoir or the fluid inlet of the pressure source; and one or more valves (82-84) fluidly connected to the fluid outlet of the attenuation means.

6 Claims, 5 Drawing Sheets

HYDRAULIC CONTROL CIRCUIT

TECHNICAL FIELD

The present invention relates to a hydraulic control circuit, and in particular a hydraulic control circuit for a roll control system of a motor vehicle.

BACKGROUND OF THE INVENTION

WO-A-2005/108128 describes a roll control system for a motor vehicle which includes a hydraulic control circuit. The hydraulic control circuit includes a source of fluid pressure, a fluid reservoir, a pressure control valve, and a number of other valves, all of which control the fluid flow to, and the fluid pressure in, the chambers of hydraulic actuators. The source of fluid pressure is a pump which is either continuously driven by the vehicle engine, or is electrically driven. As shown, but not described, in WO-A-2005/108128, the hydraulic control circuit includes an attenuation hose positioned between the pump and the pressure control valve and the other valves. The attenuation hose is intended to reduce any noise, vibration or harshness effects caused, or created, by the pressure pulses from the pump. The attenuation hose may include complex design features (such as restrictions, spirals, specific expansion rates, interconnected hoses of differing lengths) which are intended to reduce pressure pulses at differing frequencies. However, the presence of the attenuation hose creates a significant pressure drop (in the range of 10 to 20 bar (1000 kPa to 2000 kPa)). This pressure drop has an adverse effect on power loss and power consumption for the pump, even when full pump flow is not required.

FR-A-2775024 and U.S. Pat. No. 5,492,451 both discloses hydraulic control circuits in which a valve is fluidly connected between a fluid reservoir and the fluid line connecting the pump outlet to the inlet of an attenuation means. However, in both of these examples, the valve is a pressure relief valve which has the sole purpose of acting as a safety device to prevent excessive fluid pressure reaching the hydraulic circuit.

SUMMARY OF THE INVENTION

It is an object of the present invention to overcome the above mentioned problem.

A hydraulic control circuit in accordance with the present invention comprises a source of fluid pressure having a fluid inlet and a fluid outlet; a fluid reservoir fluidly connected to the fluid inlet of the pressure source; an attenuation means having a fluid inlet fluidly connected to the fluid outlet of the pressure source, and a fluid outlet; a pressure control valve fluidly connected to the fluid inlet of the attenuation means and to the fluid reservoir or the fluid inlet of the pressure source; and one or more valves fluidly connected to the fluid outlet of the attenuation means.

In the present invention, the pressure control valve is fluidly connected to the pressure source at a position which is upstream of the attenuation means. This provides advantages in terms of power consumption by the pressure source, and simplification of the attenuation means.

BRIEF DESCRIPTION OF THE DRAWINGS

The present invention will now be described, by way of example, with reference to the accompanying drawings, in which:—

DESCRIPTION OF THE PREFERRED EMBODIMENT

Figure 1:
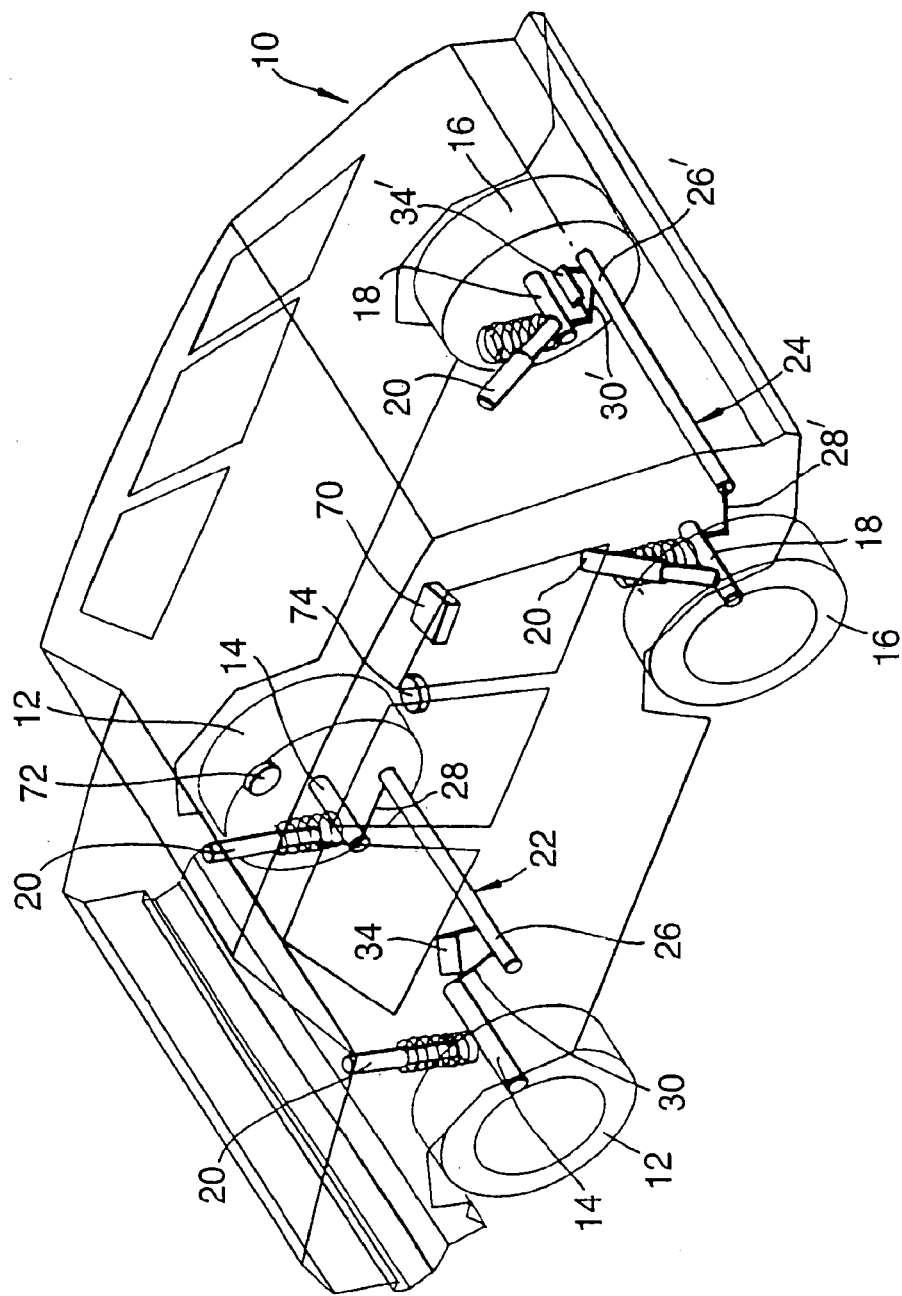
FIG. 1 is a schematic presentation of a vehicle incorporating a vehicle roll control system.

Referring to FIG. 1, a vehicle 10 is shown schematically and comprises a pair of front wheels 12 each rotatably mounted on an axle 14, a pair of rear wheels 16 each rotatably mounted on an axle 18, and a shock absorbing system 20 associated with each wheel. A portion 22 of a vehicle roll control system is associated with the front wheels 12, and a portion 24 of the vehicle roll control system is associated with the rear wheels 16. The portions 22, 24 are substantially the same but with modifications made solely to allow fitting to the vehicle 10.

Figure 2:
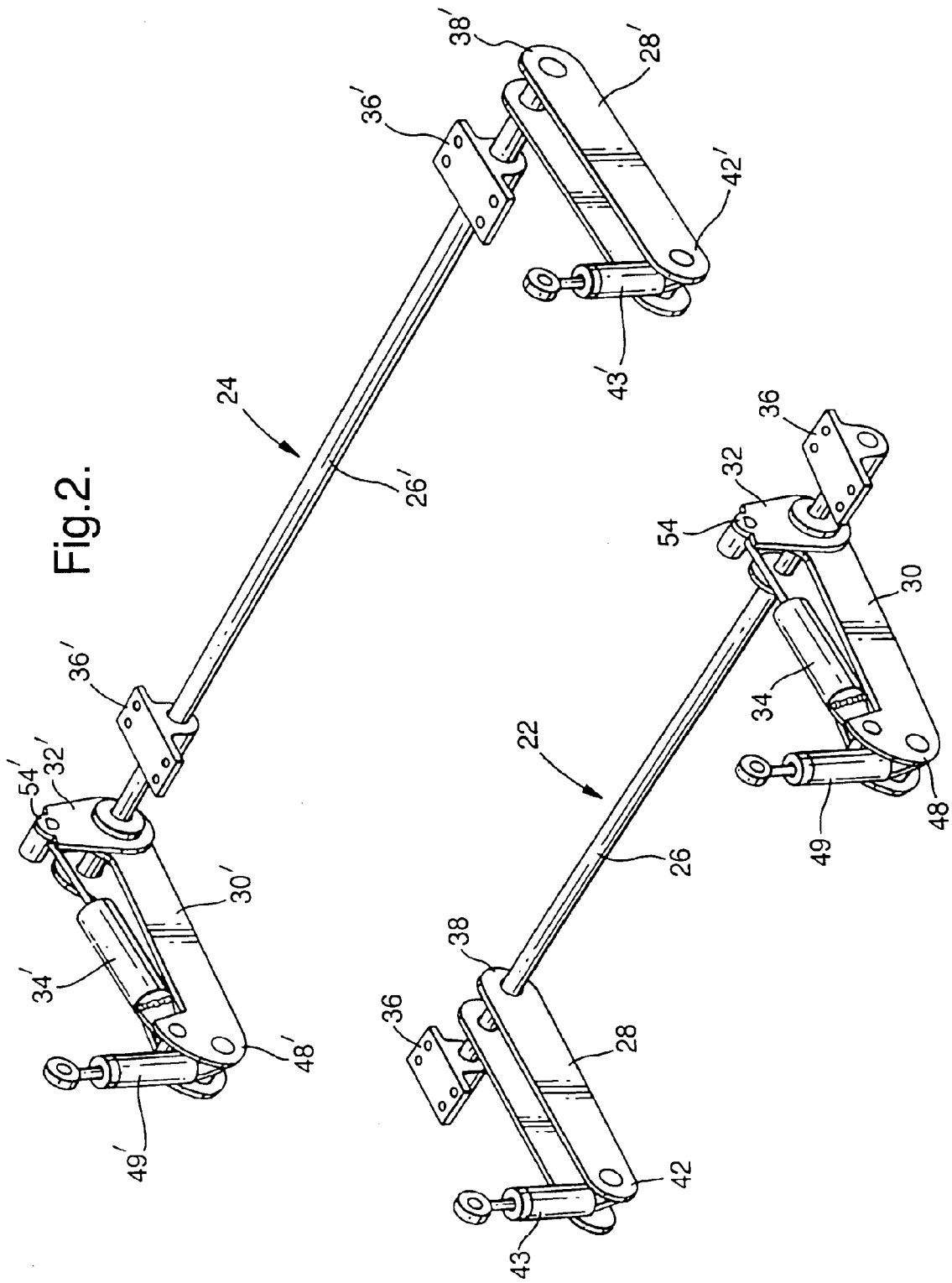
FIG. 2 is an enlarged view of the front and rear portions of the vehicle roll control system shown in FIG. 1.
Figure 3:
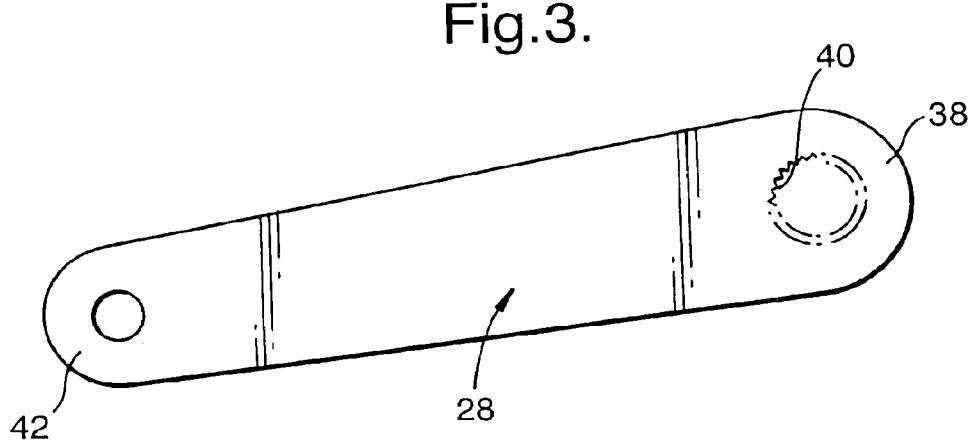
FIG. 3 is a side view of the first arm of the vehicle roll control system shown in FIG. 2.
Figure 4:
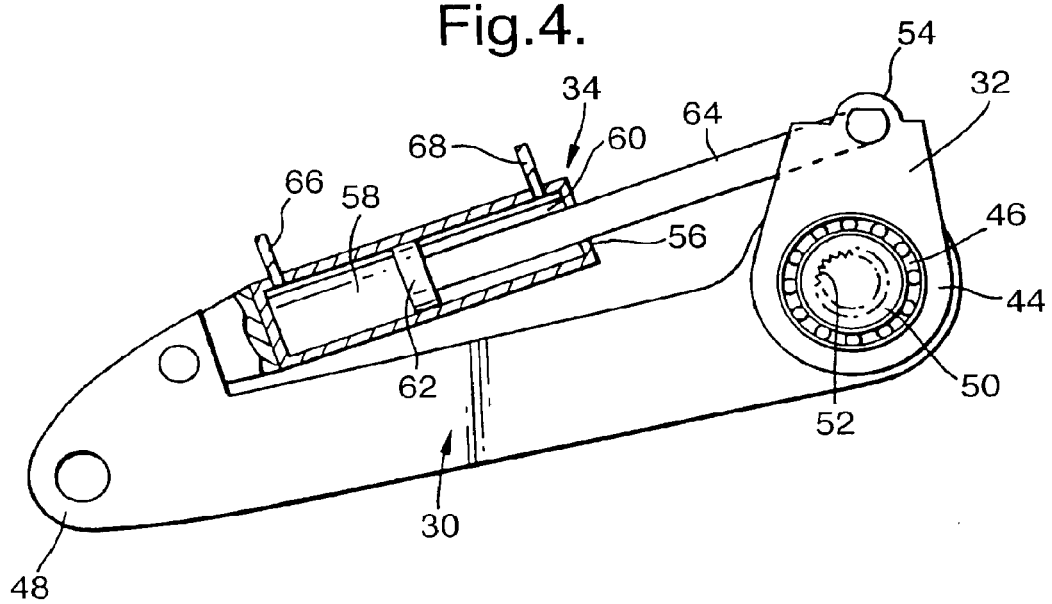
FIG. 4 is a side view of the second arm, hydraulic actuator (shown in cross-section) and lever arm of the vehicle roll control system shown in FIG. 2.

Referring in more detail to FIGS. 2 to 4, the portion 22 of the vehicle roll control system for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12 by a tie rod 43. The second arm 30 (FIG. 4) is rotatably mounted at one end 44 on the torsion bar 26 by way of a bearing 46. The other end 48 of the second arm 30 is connected to the axle 14 of the other front wheel 12 by a tie rod 49. The first and second arms 28,30 extend substantially parallel to one another when the vehicle is stationary, and substantially perpendicular to the torsion bar 26.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The front hydraulic actuator 34 (FIG. 4) extends between, and is connected to, the free end 54 of the lever arm 32 and the other end 48 of the second arm 30. The front hydraulic actuator 34 comprises a housing 56 which defines first and second fluid chambers 58,60 separated by a piston 62 which makes a sealing sliding fit with the housing. As shown in FIG. 4, the housing 56 is connected to the other end 48 of the second arm 30, and the piston 62 is connected to the free end 54 of the lever arm 32 by a piston rod 64 which extends through the second fluid chamber 60. It will be appreciated that these connections may be reversed. The fluid chambers 58,60 contain hydraulic fluid and are fluidly connected to fluid lines 66, 68 respectively. The portion 24 of the vehicle roll control for the rear of the vehicle is substantially the same, but with the components (which are primed) having a different layout. The rear hydraulic actuator 34' is substantially the same as the front hydraulic actuator 34.

Figure 5:
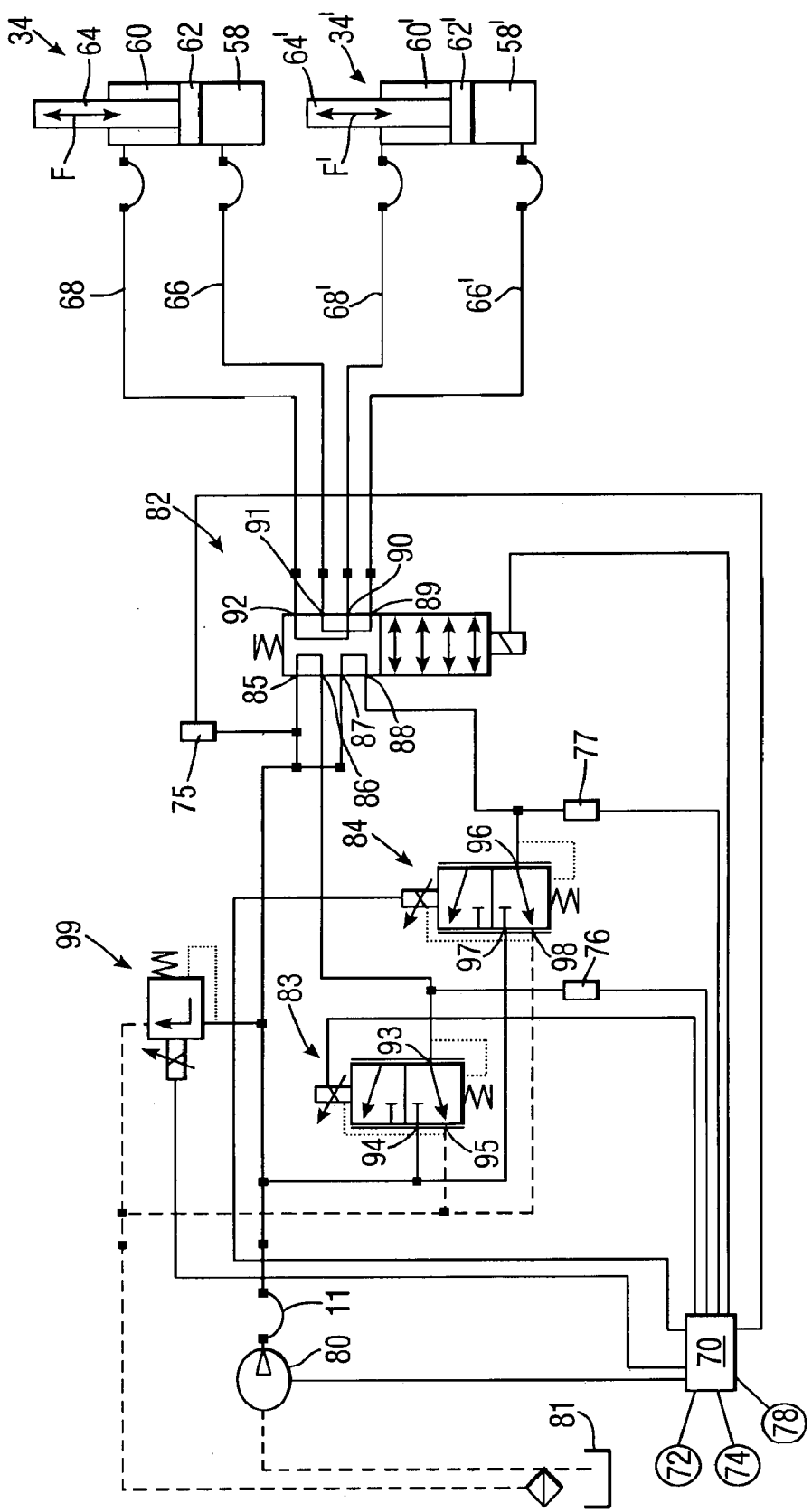
FIG. 5 is a schematic diagram of a known hydraulic and electrical control circuit of the vehicle roll control system shown in FIG. 1 when the directional valve and pressure relief valves are de-actuated or in their fail-safe mode.

The hydraulic and electrical control circuit of the vehicle roll control system of FIGS. 1 to 4 is shown in FIG. 5. The hydraulic circuit includes a fluid pump 80, a fluid reservoir 81, an attenuation hose 11, a directional valve 82, a first pressure relief valve 83, a second pressure relief valve 84, and a pressure control valve 99. The directional valve 82 has eight ports 85-92. The first pressure relief valve 83 has three ports 93-95. The second pressure relief valve 84 has three ports 96-98. The pressure control valve 99 is fluidly connected between the pump 80 and the reservoir 81. Fluid filters may be positioned after the pump 80 and/or before the reservoir 81.

The directional valve 82 has a first port 85 fluidly connected to the fluid pump 80 by way of the attenuation hose 11; a second port 86 fluidly connected to the first port 93 of the first pressure relief valve 83; a third port 87 fluidly connected to the fluid pump 80 by way of the attenuation hose 11; a fourth port 88 fluidly connected to the first port 96 of the second pressure relief valve 84; a fifth port 89 fluidly connected to the first chamber 58' of the rear actuator 34' by way of fluid line 66'; a sixth port 90 fluidly connected to the second chamber 60' of the rear actuator 34' by way of fluid line 68'; a seventh port 91 fluidly connected to the first chamber 58 of the front actuator 34 by way of fluid line 66; and an eighth port 92 fluidly connected to the second chamber 60 of the front actuator 34 by way of fluid line 68. The directional valve 82 is solenoid actuated, and has a de-actuated state (shown in FIG. 5) in which the first and second ports 85,86 are fluidly connected; the third and fourth ports 87,88 are fluidly connected; the fifth and seventh ports 89,91 are fluidly connected; and the sixth and eighth ports 90,92 are fluidly connected. In the actuated state of the directional valve 82, the first and eighth ports 85,92 are fluidly connected; the second and seventh ports 86,91 are fluidly connected; the third and sixth ports 87,90 are fluidly connected; and the fourth and fifth ports 88,89 are fluid connected. In an alternative arrangement, the directional valve 82 may be hydraulically actuated by first and second pilot (on/off) valves (not shown).

The second port 94 of the first pressure relief valve 83 is fluidly connected to the pump 80 by way of the attenuation hose. The third port 95 of the first pressure relief valve 83 is fluidly connected to the reservoir 81. In the de-actuated state of the first pressure relief valve 83 (shown in FIG. 5), the first port 93 is fluidly connected to the third port 95, and the second port 94 is fluidly isolated. In the actuated state of the first pressure relief valve 83, the first port 93 is fluidly connected to the second port 94, and the third port 95 is fluidly isolated.

The second port 97 of the second pressure relief valve 84 is fluidly connected to the pump 80 by way of the attenuation hose 11. The third port 98 of the second pressure relief valve 84 is fluidly connected to the reservoir 81. In the de-actuated state of the second pressure relief valve 84 (shown in FIG. 5), the first port 96 is fluidly connected to the third port 98, and the second port 97 is fluidly isolated. In the actuated state of the second pressure relief valve 84, the first port 96 is fluidly connected to the second port 97, and the third port 98 is fluidly isolated.

The first and second pressure relief valves 83,84 are preferably solenoid actuated as shown in FIG. 5. Alternatively, the pressure relief valves 83,84 may be hydraulically actuated by first and second pilot (on/off) valves (not shown).

The pump 80 may be driven by the vehicle engine and hence continuously actuated. Alternatively, the pump 80 may be driven by an electric motor or any other suitable means, either continuously, or variably. The pressure control valve 99 is actuated to adjust the fluid pressure in the hydraulic system between a predetermined minimum pressure and a predetermined maximum pressure. The pressure control valve 99 is also actuated to adjust the pressure differential between the first and second chambers 58, 58',60, 60' of the hydraulic actuators 34,34' respectively (when the directional valve 82 and pressure relief valves 83,84 are also actuated as required).

The electrical control circuit includes an electronic and/or computerised control module 70. The control module 70 operates the fluid pump 80, the directional valve 82, the pressure control valve 99, and the pressure relief valves 83,84, when required. The control module 70 actuates the valves 82-84,99 dependent on predetermined vehicle conditions which are determined by signals from one or more sensors, such as a first pressure sensor 76 (which detects the fluid pressure associated with the first chamber 58 of the front hydraulic actuator 34), a second pressure sensor 77 (which detects the fluid pressure associated with the first chamber 58' of the rear hydraulic actuator 34'), a third pressure sensor 75 (which detects the fluid pressure associated with the second chambers 60,60' of the actuators 34,34'), a lateral g sensor 74 (which monitors the sideways acceleration of the vehicle), a steering sensor 72 (which monitors the steering angle of the front wheels 12), a vehicle speed sensor 78, and/or any other relevant parameter.

If the control module 70 detects that roll control is required (due, for example, to cornering of the motor vehicle 10), the control module determines if the module has to generate a force F, F' which acts on the piston rods 64,64' respectively to extend the front and/or rear actuators 34,34', or to compress the front and/or rear actuators, in an axial direction. In the present invention, the force F on the front actuator 34 may be different from the force F' on the rear actuator 34' dependent on the actuation of the pressure relief valves 83,84; and the value of the pressure differential is set by the pressure control valve 99.

In this arrangement, the roll control system can be operated in four different modes when the directional valve 82 is actuated and the pressure control valve 99 is actuated. In a first mode, when the first pressure relief valve 83 is actuated and the second pressure relief valve 84 is de-actuated, the second fluid chambers 60, 60' of the front and rear hydraulic actuators 34, 34' are at substantially the same pressure, the first fluid chamber 58 of the front hydraulic actuator is at a pressure which is substantially equal to or less than the pressure in the second chambers dependent on the pressure relief valve 83, and the first fluid chamber 58' of the rear hydraulic actuator is at a different pressure. In a second mode, when the first pressure relief valve 83 is de-actuated and the second pressure relief valve 84 is actuated, the second fluid chambers 60, 60' of the front and rear hydraulic actuators 34, 34' are at substantially the same pressure, the first fluid chamber 58' of the rear hydraulic actuator is a pressure which is substantially equal to or less than the pressure in the second chambers dependent on the pressure relief valve 84, and the first fluid chamber 58 of the front hydraulic actuator is at a different pressure. In a third mode, when the pressure relief valves 83, 84 are de-actuated, the first fluid chambers 58, 58' of the hydraulic actuators 34, 34' are at substantially the same pressure, and the second fluid chambers 60, 60' of the hydraulic actuators are at substantially the same pressure but at a different pressure to the first fluid chambers. In a fourth mode, when the pressure relief valves 83, 84 are actuated, the second fluid chambers 60,60' of the front and rear hydraulic actuators 34, 34' are at substantially the same pressure, the first fluid chamber 58 of the front hydraulic actuator is at a pressure which is substantially equal to or less than the pressure in the second chambers dependent on the pressure relief valve 83, and the first fluid chamber 58' of the rear hydraulic actuator is at a pressure which is substantially equal to or less than the pressure in the second chambers dependent on the pressure relief valve 84. Also, in this fourth mode, the pressures in the first chambers 58, 58' may be different from one another dependent on the pressure relief valves 83, 84. In all of the above modes, the value of any pressure differential is control by the pressure control valve 99 and the pressure relief valves 83, 84. This arrangement provides improvement management of the compression or expansion of the hydraulic actuators, and hence provides improved roll control of the vehicle.

Referring to FIG. 5, the known hydraulic control circuit is substantially the same as one of the hydraulic control circuits shown in WO-A-2005/108128, which is incorporated herein by reference for further details of its operation. Also as described in WO-A-2005/108128, alternative arrangements may be made for the configuration of the directional and pressure relief valves, and for the hydraulic actuators, which are incorporated herein by reference. This known hydraulic control circuit includes a source of fluid pressure (pump 80), a fluid reservoir 81, an attenuation hose 11, a pressure control valve 99, a number of other valves 82-84, and front and rear hydraulic actuators 34, 34' for the roll control system of a motor vehicle 10. As can be seen, the pressure control valve 99 is fluidly connected to the fluid outlet of the attenuation hose 11 such that the attenuation hose is positioned between the pump 80 and the pressure control valve, and the pressure control valve controls fluid flow exiting the attention hose and flowing to the fluid reservoir 81.

Figure 6:
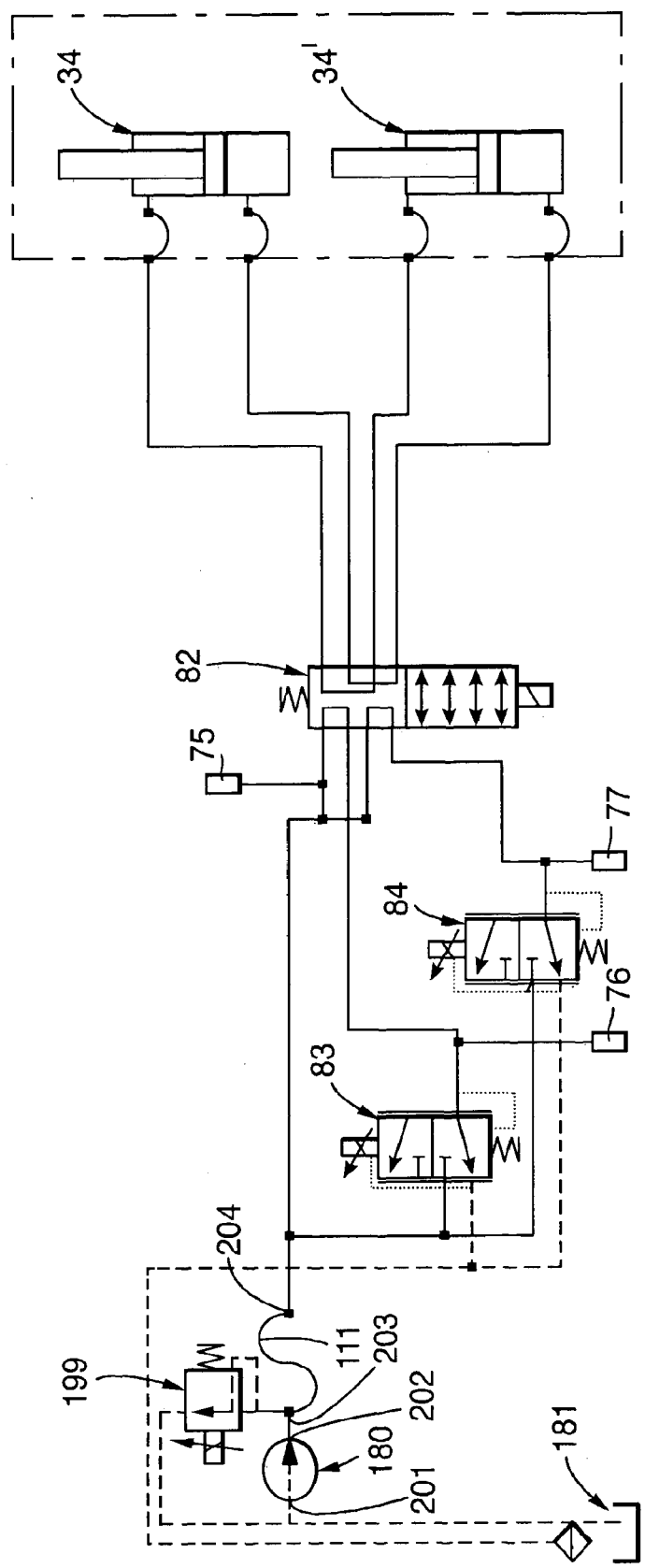
FIG. 6 is a schematic diagram of a hydraulic control circuit in accordance with the present invention for the vehicle roll control system shown in FIG. 1 when the directional valve and the pressure relief valves are de-actuated or in their fail-safe mode.

Referring to FIG. 6, the hydraulic control circuit 100 in accordance with the present invention comprises a source of fluid pressure 180 having a fluid inlet 201 and a fluid outlet 202; a fluid reservoir 181 fluidly connected to the fluid inlet of the pressure source; an attenuation means, preferably in the form of a hose 111, having a fluid inlet 203 fluidly connected to the fluid outlet of the pressure source, and a fluid outlet 204; a pressure control valve 199; and one or more valves 82-84. The source of fluid pressure 180 is preferably a pump which is either continuously driven by an engine, or is electrically driven. The attenuation means may alternatively be a restricted flow orifice or other suitable attenuating device. The pressure control valve 199 is fluidly connected between the fluid outlet 202 from the pump 180 and the fluid inlet 203 to the attenuation hose 111, and controls fluid flow from the pump to the fluid reservoir 181. The one or more other valves 82-84 are fluid connected between the fluid outlet 204 from the attenuation hose 111, hydraulic actuators 34, 34', and the fluid reservoir 181. Operation of the hydraulic actuators is controlled by actuation of the one or more valves 82-84 and the pressure control valve 199 (substantially as described above for FIG. 5 and in WO-A-2005/108128). Also as described in WO-A-2005/108128, the configuration of the valves 82-84 may take other forms.

By moving the pressure control valve 199 such that it is fluidly connected to the inlet side of the attenuation hose 111, rather than fluidly connected to the outlet side of the attenuation hose, the majority of fluid flow from the pump 180 is re-circulated by the pressure control valve 199 back to the fluid reservoir 181 (or possibly directly back to the fluid inlet of the pump). As a consequence, fluid flow through the attenuation hose 111 will generally only occur when the one or more valves 82-84 are actuated to provide pressurised fluid to the actuators 34, 34'. In contrast to the known prior art, fluid flow through the attenuation hose 111 generally only occurs when actually required, rather than on a constant basis. The arrangement of FIG. 6 (when compared to FIG. 5) provides a reduction in power consumption; and makes it easier to overcome noise, vibration, or harshness effects, and providing for simpler designs of attenuation hose.

Although the present invention has been described in relation to its use with the above described vehicle roll control system, the present invention can also be used with other arrangements of vehicle roll control system, such as those comprising a single torsion bar and hydraulic actuator; or those having differing type of hydraulic actuator; or those having a different valve layout. Further still, the present invention can also be used for hydraulic control circuits having alternative applications other than vehicle roll control systems.

The invention claimed is:

1. A hydraulic control circuit comprising a source of fluid pressure having a fluid inlet and a fluid outlet; a fluid reservoir fluidly connected to the fluid inlet of the pressure source; an attenuation means having a fluid inlet fluidly connected to the fluid outlet of the pressure source, and a fluid outlet; a pressure control valve fluidly connected to the fluid inlet of the attenuation means and to at least one of the fluid reservoir and the fluid inlet of the pressure source; and at least one valve fluidly connected to the fluid outlet of the attenuation means.

2. A hydraulic control circuit as claimed in claim 1, wherein the source of fluid pressure is a pump.

3. A hydraulic control circuit as claimed in claim 1, wherein the attenuation means is an attenuation hose.

4. A hydraulic control circuit as claimed in claim 1 wherein the attenuation means is a restricted flow orifice.

5. A vehicle roll control system for a vehicle having a pair of wheels each rotatable on an axle, comprising a torsion bar; a first arm attached to the torsion bar at one end of the first arm and being connectable to one of the axles of the wheels at the other end of the first arm; a hydraulic actuator attached to the torsion bar; and a control means connected to the hydraulic actuator and controlling the operation thereof on detection of a predetermined vehicle condition; wherein the control means comprises a hydraulic control circuit as claimed in claim 1.

6. A hydraulic control circuit, comprising:
 a source of fluid pressure having a fluid inlet and a fluid outlet;
 a fluid reservoir in fluid communication with said fluid inlet of said pressure source;
 an attenuation means having a fluid inlet in fluid communication with said fluid outlet of said pressure source and having a fluid outlet;
 at least one valve in fluid communication with said fluid outlet of said attenuation means; and
 a pressure control valve in fluid communication with said fluid reservoir and disposed hydraulically between said fluid outlet of said source of fluid pressure and said fluid inlet of said attenuation means for conveying fluid to the attenuation means only when said at least one valve is actuated and for re-circulating the rest of the fluid to one of said fluid reservoir and said fluid inlet of said pump.

* * * * *